Figure 1:
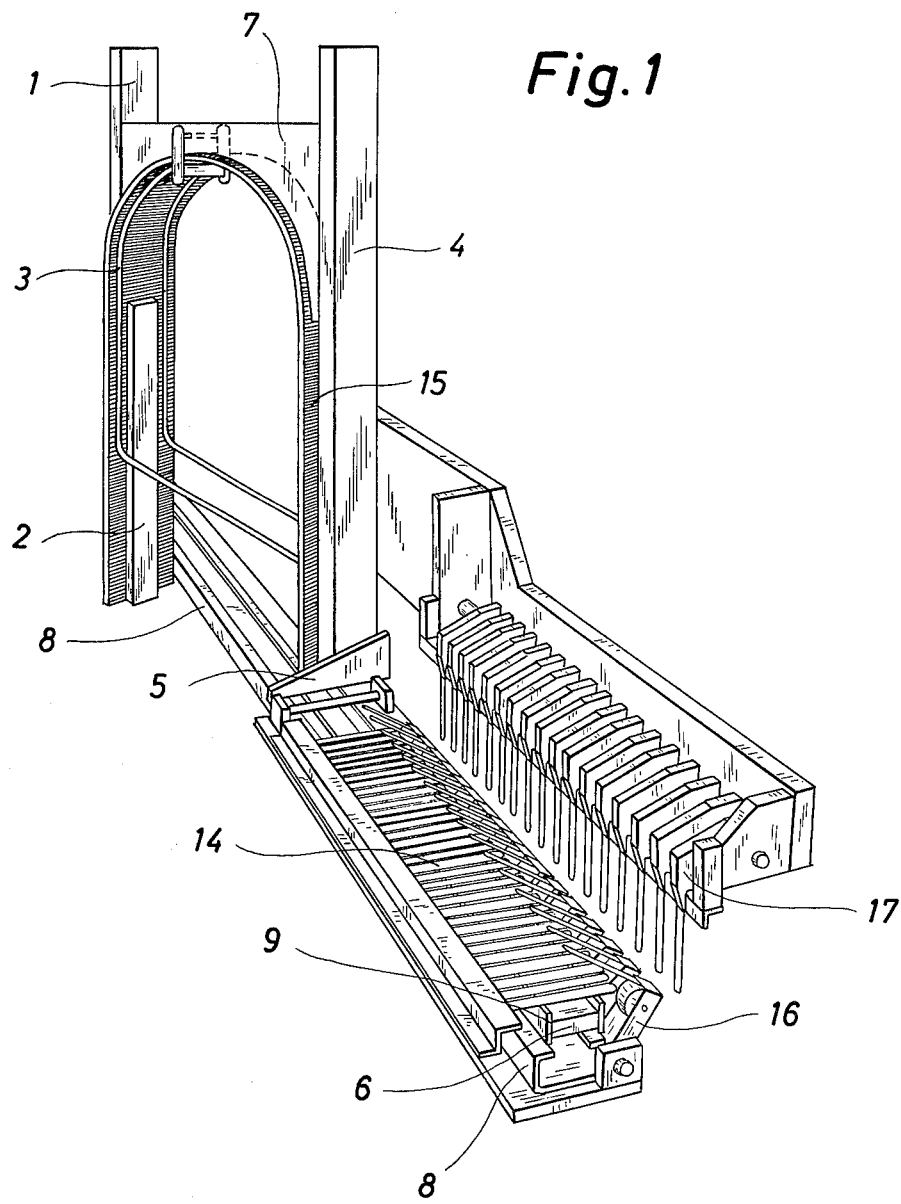

United States Patent [19]

Mørch

[11] 4,105,384
[45] Aug. 8, 1978

[54] APPARATUS FOR INSERTION OF STICKS IN ICE CREAM BODIES

[75] Inventor: Ole Christian Mørch, Solrød Strand, Denmark

[73] Assignee: Stickma A/S, Herluf, Denmark

[21] Appl. No.: 699,352

[22] Filed: Jun. 24, 1976

[30] Foreign Application Priority Data

Jun. 25, 1975 [DK] Denmark .............................. 2884/75

[51] Int. Cl.² ............................................ A23G 9/26
[52] U.S. Cl. ............................................ 425/126 S
[58] Field of Search ..................... 425/126 S; 198/486, 198/489, 750

[56] References Cited

U.S. PATENT DOCUMENTS

| 3,478,703 | 11/1969 | Peppler et al. | 425/126 S |
| 3,730,661 | 5/1973 | Tremblay | 425/126 S |

FOREIGN PATENT DOCUMENTS

| 741,566 | 8/1966 | Canada | 425/126 S |
| 1,047,222 | 12/1958 | Fed. Rep. of Germany | 425/126 S |

*Primary Examiner*—Francis S. Husar
*Assistant Examiner*—William R. Briggs
*Attorney, Agent, or Firm*—Mason, Fenwick & Lawrence

[57] ABSTRACT

Apparatus for insertion of sticks in ice cream bodies, the apparatus consisting of a feeding device for sticks and a conveyor adapted to take the sticks from the feeding device and move them to gripping means which insert the sticks in the ice cream bodies, the conveyor having longitudinally arranged protrusions which support each stick in two relatively short zones situated at a relatively long distance from each other, carrier means on the conveyor engaging the lowermost stick in a pile of sticks in the feeding device, and holding means being provided to hold the next stick in the pile against movement.

8 Claims, 6 Drawing Figures

U.S. Patent  Aug. 8, 1978  Sheet 1 of 3  4,105,384

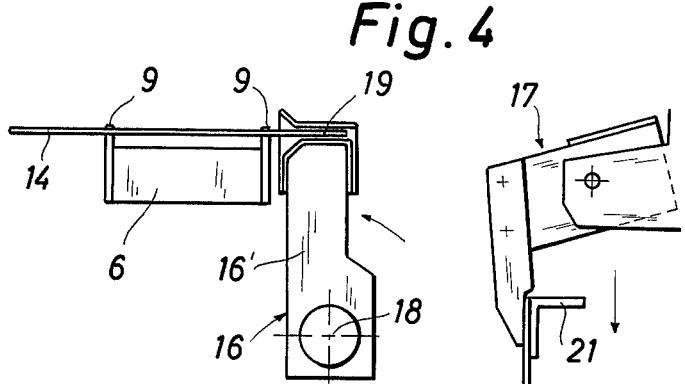
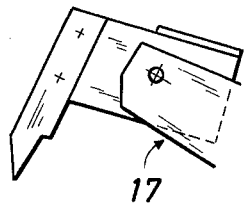
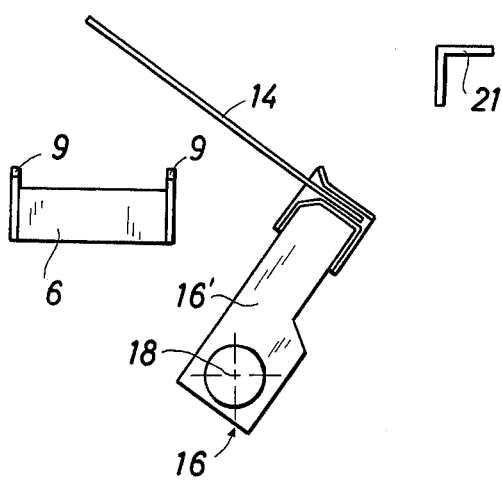
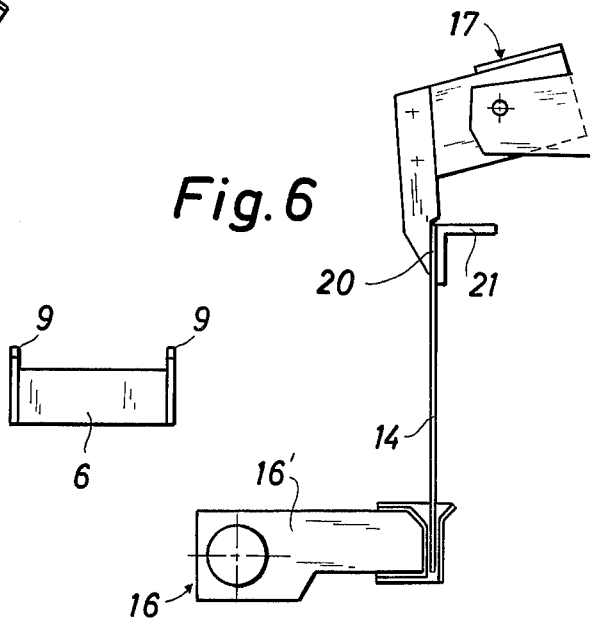

APPARATUS FOR INSERTION OF STICKS IN ICE CREAM BODIES

This invention relates to an apparatus for insertion of sticks in partly frozen ice cream bodies situated in mould cavities which are open at the top and which are continuously or stepwise moved under the insertion apparatus which has a feeding mechanism for the sticks, the feeding mechanism having a substantially vertical passage in which a pile of horizontally arranged sticks moves downwardly, the apparatus further having a conveyor arranged below said passage and adapted to receive the sticks and move them to gripping means adapted to take the sticks from the conveyor and insert them in the ice cream bodies.

Such apparatuses are often used for ice freezing machines having a conveyor, for instance a belt conveyor or a supporting member which is pivotal about a vertical axis and carries a plurality of mould cavities which are arranged in radial rows which are moved in turn to a position below the apparatus for insertion of the sticks, and the apparatus inserts a straight row of sticks in the straight row of mould cavities in which ice cream in partly frozen condition is contained. The consistency of the ice cream is so that the sticks may be inserted rather easily in the bodies of ice cream and can be retained in vertical position after the sticks have been released from the gripping means of the apparatus.

An important requirement to such an apparatus is that a stick is inserted in each mould cavity in each insertion operation, as the finished ice lollies, i.e. the moulded ice cream bodies in which the sticks are embedded, are drawn up from the mould cavity by a pull in the stick, and if no stick is available in one or more mould cavities, the ice cream body in said cavity will not be removed by the operation mentioned. Removal of the hard-frozen ice cream body without stick is very difficult and will result in interruption of work. As such interruptions cannot be tolerated in a modern factory the machine is controlled by an operator who controls that a stick is inserted in each ice portion in each insertion operation, and if this is not the case, the lacking stick or sticks are inserted by hand.

The lack of sticks may have several reasons, for instance that some means in the inserted or its feeding and conveyor means fail. The sticks are generally made of wood and having because of the structure of the material and the manufacture of the sticks various defects. The sticks may have recesses or cutouts, or they can be arched or in other ways be non-planar because of warping. The conveying and gripping means of the known inserters are adapted for sticks without defects, and therefore defective sticks of the kind mentioned may result in a row of sticks which is not complete.

The object of this invention is to provide a new construction for an inserter of the type mentioned which is more reliable than the known inserters, so that it can be used for an ice freezing machine without the necessity of having an operator for controlling the insertion of the sticks. The apparatus according to the invention has further advantages which will be explained in the following.

The apparatus according to the invention is characterised in that the conveyor along its sides has protrusions which are adapted to support the sticks in two relatively short zones situated at a relatively long distance from each other, the conveyor further having carrier means for the sticks protruding above the said protrusions, stationary holding means being mounted at the vertical passage above the carrier means, which holding means are adapted to hold the stick lying above the stick which at that moment is engaged by the carrier means.

In such an inserter the conveyor will be able to take the sticks from the feeding passage and move them to the gripping means in a complete row even if some of the sticks are defective, as described, so that each row of sticks which is gripped by the gripping means and moved to and inserted in the ice cream bodies is complete. The reason for this is that the sticks when transmitted from the feeding passage to the conveyor are kept in two zones spaced at a relatively long distance apart, which zones are fixed in relation to the other means of the apparatus, so that the position of other portions of the sticks is without any importance for the feeding, conveying and gripping.

A special advantage of the machine according to claim 2 is that another and different slide may easily be substituted for the slide in the apparatus, so that the apparatus may easily and without great costs be adapted for operations where the distance between the ice cream portions varies.

The movement of the sticks from the horizontal position on the slide to the vertical position over the mould cavities may be divided into two steps by means of two sets of gripping means, as explained in claims 3 and 4.

As it takes a certain time to return the slide and fill it up with a new row of sticks it will be suitable to adapt the apparatus to arrange twice the number of sticks on the slide as the number of ice cream bodies in a row and adapt the gripping means in such a way that the first set of gripping means takes all the sticks from the slide in every second operation, and that the second set of gripping means moves the first half and the second half of the sticks, respectively, to the ice cream bodies in each operation, as stated in claim 5.

In order to eliminate every risk of lack of sticks because of interruptions of the row of sticks in the feeding device the feeding passage may according to the invention be constructed as stated in claim 7, whereby a continuous row of sticks in the feeding device can be maintained in a simple manner.

Figure 2:
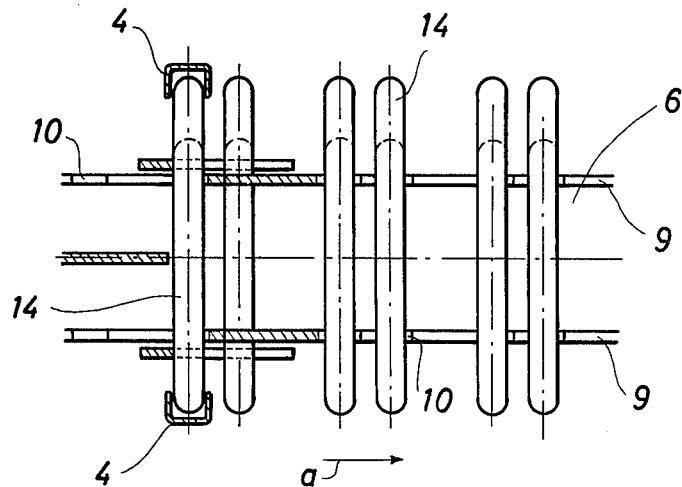
Figure 3:
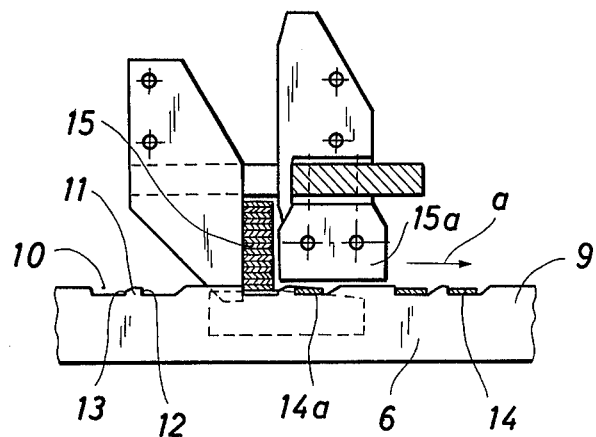

The apparatus will now be described in details with reference to the accompanying drawings, in which FIG. 1 shows a perspective view of an apparatus according to the invention, FIG. 2 shows a portion of a conveyor slide in top plane view, FIG. 3 shows a portion of the feeding passage and the conveyor slide in side elevation view, FIG. 4 shows a conveyor slide in end view together with the gripping means, FIG. 5 shows the same as FIG. 4 in a second position of the parts, and FIG. 6 shows the same as FIGS. 4 and 5 in a third position of the parts.

The apparatus shown in FIG. 1 is adapted to be mounted above an ice freezing machine (not shown) in such a way that a part of the apparatus extends above the mould cavities for the ice cream bodies.

The apparatus or inserter according to the invention has a stick feeding passage or channel which is shaped like an inverted U and as a whole is denoted 1. One of the vertical legs 2 of the said inverted U constitutes a passage in which a pile of sticks is moved upwards. The sticks are fed at the bottom of the channel by feeding means of conventional type, for instance screw feeders, which are not shown in the drawing. These mechanical feeding means push the sticks upwards in the channel portion 2. The channel portion 2 is by means of an arched channel portion 3 connected to another vertical portion 4 which constitutes the feeding passage of the apparatus, and in this channel the sticks are moved downwards by the gravity of the pile and are led to a transmitting station 5, in which the sticks are transmitted to a horizontally movable conveyor slide 6.

The arched portion 3 of the feeding channel is supported by a beam 7 in such a way that it is vertically movable in two vertical columns, in which roller means (not shown in the drawing) are provided, so that the beam can very easily move upwards and downwards.

Because of the explained construction the feeding channels in the feeding device will always contain a complete, uninterrupted row of sticks, as the pressure of the pile of sticks in the channel portion 3 will be able to move the beam 7 upwards, and as soon as the pressure is released the beam will fall down because of the gravity, so that the movements of the beam 3 will compensate for any irregularity of the feeding of sticks at the bottom of the column 2, and no empty spaces in the row of sticks will be possible, even if the feeding of sticks at the bottom of the column 2 does not correspond to the delivery of sticks at the station 5.

The conveyor slide 6 is arranged horizontally and is mounted on horizontal beds 8, so that it can move from the station 5 to the outer end of the beds 8, as shown in FIG. 1, and can be returned to a first position in which it is situated on the portion of the beds 8 which is shown between the two columns 2 and 4. The return movement in which the slide is empty, i.e. without any sticks, is carried out at a higher speed than the forward movement, and these movements of the slide together with other movements of the apparatus are controlled automatically by means of electric, hydraulic and/or pneumatic control means of conventional type, which need not be explained.

The conveyor slide 6 shown in FIGS. 2–6 has at the top two parallel ribs 9, FIGS. 2, 3, which have stick receiving and holding slots in the form of cut-outs 10 arranged in pairs, and between the cut-outs 10 teeth 11 are provided. The trailing edges 12 of the cut-outs 10 are at right angles to the longitudinal direction of the rib 9, whereas the leading edge has an inclined portion 13.

The delivery station 5 is schematically illustrated in FIGS. 2 and 3, and the channel portion 4 is shown in FIG. 2 as a cross-section through two U-profiles in which the sticks 14 are guided. In FIG. 3 a portion 15 of the stick pile is shown, and it appears from the figure that the slide 6 during its movement according to the arrow *a* passes below the pile 15 which rests with its weight on the ribs 9. When the lowermost stick in the pile falls into a cut-out 10 the trailing edge 12 will abut the stick, so that the stick will be moved together with the slide and will be pushed away from the pile 15. This is possible because the stick immediately above the moving lowermost stick will be kept in place by means of two plate-shaped holding members 15*a* which are situated above the ribs 9. In this manner a stick 14 will be transmitted from the pile 15 to each of the cut-outs 10 during the forward movement of the slide 6, and in the outer position of the slide shown in FIG. 1 a complete row of sticks will be arranged on the slide, and the rear stick will be situated in front of the station 5.

As each of the sticks 14 is supported by the ribs 9 in two zones which are spaced at a relatively long distance from each other and the trailing edges of the cut-outs 10 which move the sticks are arranged in the same zones the sticks will be moved by the slide even if they are deformed, for instance arched or twisted.

The apparatus is adapted in such a way that twice the number of sticks as the number of rows of ice cream bodies in the ice freezing machine are arranged on the slide in each feeding operation, and as shown in FIGS. 2 and 3, the sticks are arranged in pairs, where the distances between the pairs are the same as the distances between the ice cream portions in a row in the ice freezing machine. A transfer means 16 is provided adjacent the conveyor slide 6 when the conveyor slide is in its forward or transfer position illustrated in FIG. 1. The transfer means includes a pivot shaft having an axis 18 about which a plurality of pivot arms 16' are mounted for pivotal movement. The outer ends of each of the arms are provided with a stick receiving and holding means into which the ends 19 of the sticks 14 are positioned by rotation of the arms 16' in a counter clockwise direction to the position illustrated in FIG. 4.

The number of arms 16' is equal to the number of sticks carried by the conveyor slide 6 and the arms are spaced along the length of the pivot axis 18 in alignment with the slots or cutouts 10 in which the sticks 14 are positioned. Consequently, positioning of the arms 16' in the vertical position illustrated in FIG. 4 followed by rotation of the arms 16' in a clockwise direction through the position illustrated in FIG. 5 to the position illustrated in FIG. 6 results in a lifting removal of all of the sticks from the slide 6 which is then free to start movement toward delivery station 5 as the initial step in reloading of the slide.

A plurality of gripping means 17 are provided for lifting the sticks from the holding means 16' etc. for subsequent vertical insertion into the ice cream bodies carried in the mould means positioned below the gripping means 17. However, there are only half as many gripping means 17 as there are arms 16 and sticks 14 so that only half of the sticks are engaged on their upper ends 20 upon simultaneous actuation of all of the gripping means 17. The individual gripping means 17 are positioned so that they engage alternate ones of the sticks held by means 16' etc. and consequently engage one stick of each stick pair. Upon actuation of the gripping means 17, half of the sticks are consequently engaged by the gripping means which is then moved vertically upward so that half of the sticks are removed from the holding means on the outer ends of the arms 16' and are held by the gripping means prior to subsequent downward movement in which the sticks are inserted in the row of ice cream bodies positioned beneath the sticks. However, before such downward movement is accomplished, the arms 16' and remaining sticks thereon are rotated approximately 45° to the position illustrated in FIG. 5 so that they are no longer positioned below the ends of the sticks 14 held by gripping means 17 which sticks can consequently be moved downwardly into the ice cream bodies. At the same time, the remaining sticks carried by means 16' etc. are returned to the position illustrated in FIG. 5, they are indexed by an amount equal to the spacing between the two sticks of each pair of sticks as illustrated in FIG. 2 so that upon subsequent rotation of the arms 16' in a clockwise direction back to the position illustrated in FIG. 6, the remaining sticks are positioned in alignment with the gripping means 17. Gripping means 17 is then actuated to move downwardly and grip the sticks and then lift the sticks upwardly with arms 16' then being rotated in a counter clockwise direction all the way back to the position illustrated in FIG. 4 for engaging a new supply of sticks on the conveyor slide 6 which has been reloaded during the time following the initial lifting movement of the sticks from the slide. It will be observed that the gripping means 17 includes an abutment portion 21 against which a pivot portion urges the upper end 20 of the sticks as shown in FIGS. 4 and 6.

Consequently, it will be appreciated that as soon as the sticks are removed from slide 9 by means 16' etc., the slide 9 can initiate its return to the start position so that a new supply of sticks is deposited in the slots 10 to enable a repetition of the cycle in due course.

I claim:

1. Apparatus for positioning sticks in partially frozen ice cream bodies provided in aligned mould cavities which are open at the top, said apparatus comprising a stick supply source in which a supply of sticks is maintained, a plurality of moulds each having an open-topped mould cavity, a vertically movable stick inserting apparatus mounted above said mould cavities including individual stick grasping means for grasping and holding individual sticks and vertically movable support means for said grasping means for effecting insertion movement of said individual sticks into said mould cavities, stick infeed means including a plurality of upwardly facing individual stick receiving and holding slots for receiving sticks from said stick supply source, means supporting said stick infeed means for movement of said stick receiving and holding slots to to a position beneath said stick supply source for receipt of individual sticks in said stick receiving and holding slots to a transfer position adjacent said stick inserting apparatus, transfer means mounted adjacent said stick infeed means for removing sticks from said stick infeed means when said stick infeed means is in said transfer position and positioning said sticks in a vertical removal position for engagement by said grasping means for removal from said transfer means for subsequent insertion into said mould cavities, wherein there are two stick receiving and holding slots for each of said individual stick grasping means and said transfer means consists of plural individual stick holding members equal in number to the number of said receiving and holding slots for simultaneously moving all of said sticks from said receiving and holding slots to said vertical removal position and said grasping means includes individual stick grasping members positioned to initially engage alternate ones of said sticks held by said holding members in said removal position for removal of said engaged sticks from said holding members and subsequent insertion thereof into said mould cavities and wherein said transfer means is adapted for movement to position the sticks remaining on said transfer means for subsequent engagement by said stick grasping members to effect removal of said last-mentioned sticks from said transfer means by said grasping means for subsequent insertion in mould members.

2. The invention of claim 1 wherein said stick receiving and holding slots on said stick infeed means comprise pairs of slots with the slots of each pair being closely spaced adjacent each other with the distance between the slots of adjacent pairs being greater than the spacing between the slots of each pair of slots.

3. The invention of claim 2 wherein said stick receiving and holding slots are oriented parallel to each other and perpendicular to the direction of movement of said stick infeed means.

4. The invention of claim 3 wherein said stick infeed means comprises a conveyor slide supported for reciprocation on a horizontal bed, said conveyor slide including first and second parallel spaced rib members oriented in a horizontal plane, each of said spaced rib members having an upper edge surface, said stick receiving and holding slots being formed in said upper edge surfaces of said ribs, said ribs being spaced apart a distance so that they respectively engage support portions of said sticks adjacent the ends of said sticks to provide a stable support for said sticks.

5. The invention of claim 4 wherein said transfer means includes a plurality of pivot arms mounted for pivotal movement about a pivot axis adjacent said transfer position of said conveyor slide between a vertical position and a horizontal position, said individual stick holding members being mounted on the ends of said pivot arms and engageable with the ends of sticks carried by said conveyor slide when said pivot arms are in their vertical position for lifting said sticks from said slide and positioning said sticks in their vertical removal position upon pivotal movement of said arms to the horizontal position of said arms.

6. The invention of claim 4 wherein said conveyor slide is detachable from said horizontal bed and said grasping means and holding means are adjustable in the direction of movement of said conveyor slide.

7. The invention of claim 1 wherein said stick supply source comprises an inverted U-shape feed passageway defining means consisting of two leg portions and an upper inverted arcuate portion in which sticks are provided for movement, the lower end of one of the leg portions of said U-shaped passageway defining means being positioned over said stick inserting apparatus when said stick inserting apparatus is moved therebeneath, the other leg portion of said inverted U-shaped passageway defining means being connected to a stick feeding mechanism adapted to insert sticks therein for upward movement, the upper inverted arcuate portion of said U-shaped passageway defining means connecting said two vertical leg portions being supported for vertical movement upward in accordance with the number of sticks in said passageway and for downward movement under the action of gravity.

8. Apparatus for positioning sticks in partially frozen ice cream bodies provided in aligned mould cavities which are open at the tip, said apparatus comprising a plurality of aligned moulds having cavities which are open at the top, a stick supply source in which a vertical stack of sticks is maintained, a movable stick inserting apparatus mounted above said mould cavities including individual stick grasping means for grasping and holding individual sticks and vertically movable support means for said individual stick grasping means for effecting insertion of individual sticks into said mould cavities, stick infeed slide means including a plurality of upwardly facing individual stick receiving and holding slots for receiving sticks from the lower end of said vertical stack of sticks, said slots supporting said sticks only adjacent the end portion of the sticks, means supporting said stick infeed slide means for reciprocation beneath the lower end of said vertical stack of sticks for positioning individual sticks from said stack in said receiving and holding slots and to a transfer position adjacent said stick inserting apparatus, transfer means including stick holding members mounted adjacent said infeed slide for removing sticks from said infeed slide when said infeed slide is in said transfer position and positioning said sticks in a vertical removal position for engagement by said individual stick grasping means for removal from said transfer means for subsequent insertion into said mould cavities, wherein the number of stick receiving and holding slots on said stick infeed slide means is twice the number of said individual stick grasping means, said slots are arranged in pairs with the slots of each pair being closely spaced adjacent each other with the distance between the slots of adjacent pairs being greater then the spacing between the slots of each pair of slots and said stick holding members are equal to the number of said receiving and holding slots so that said holding members simultaneously move all of said sticks from said receiving and holding slots to said vertical removal position and said individual stick grasping means is positioned to initially engage alternate ones of said sticks held by said holding members in said removal position for removal of said engaged sticks from said holding members and subsequent insertion thereof into said mould cavities and wherein said transfer means is adapted for movement to position the sticks remaining on said transfer means for subsequent engagement by said stick grasping members to effect removal of said last-mentioned sticks from said transfer means by said grasping means for subsequent insertion in mould members.

* * * * *